Figure 1:
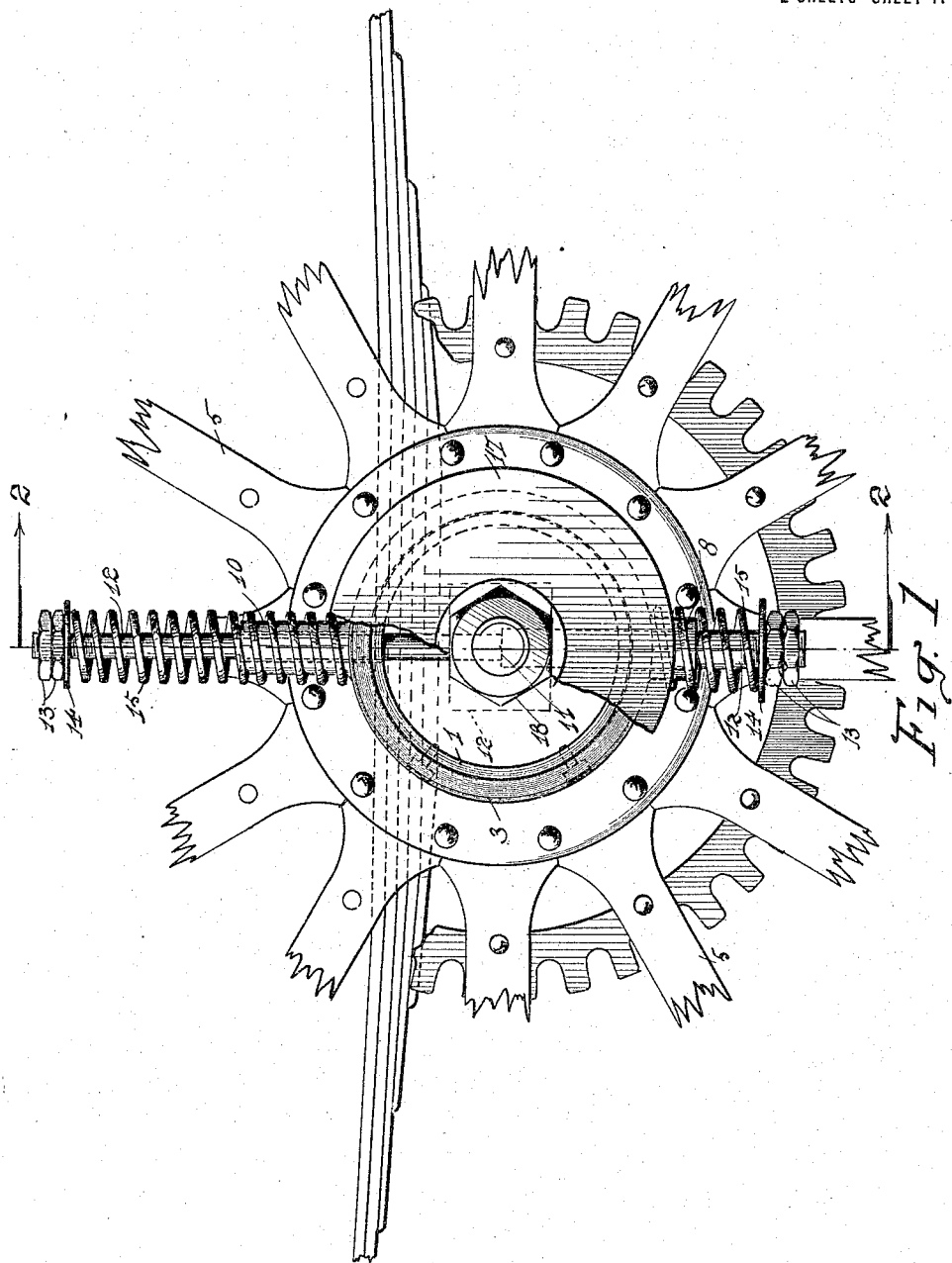

A. DUVAL.
SPRING MOUNTED SKEIN.
APPLICATION FILED JULY 24, 1914.

1,168,791.

Patented Jan. 18, 1916.
2 SHEETS—SHEET 1.

Witnesses:
A. Pizzocolo
O. Bastien

ALFRED DUVAL
Inventor

By Marion & Marion
Attorneys

UNITED STATES PATENT OFFICE.

ALFRED DUVAL, OF CHICOPEE FALLS, MASSACHUSETTS.

SPRING-MOUNTED SKEIN.

1,168,791.  Specification of Letters Patent.  Patented Jan. 18, 1916.

Application filed July 24, 1914. Serial No. 852,846.

*To all whom it may concern:*

Be it known that I, ALFRED DUVAL, a citizen of the United States of America, residing at No. 29 Olea street, Chicopee Falls, Massachusetts, United States of America, have invented certain new and useful Improvements in Spring-Mounted Skeins; and I do hereby declare that the following is a full, clear, and exact description of the invention, such as will enable others skilled in the art to which it appertains to make and use the same.

The invention to be hereinafter described relates to spring mounted skeins.

In order to more clearly disclose the construction, operation, and use of the invention, reference should be had to the accompanying drawings forming part of the present application.

Throughout the several figures of the drawings like reference characters designate the same parts.

Figure 2:
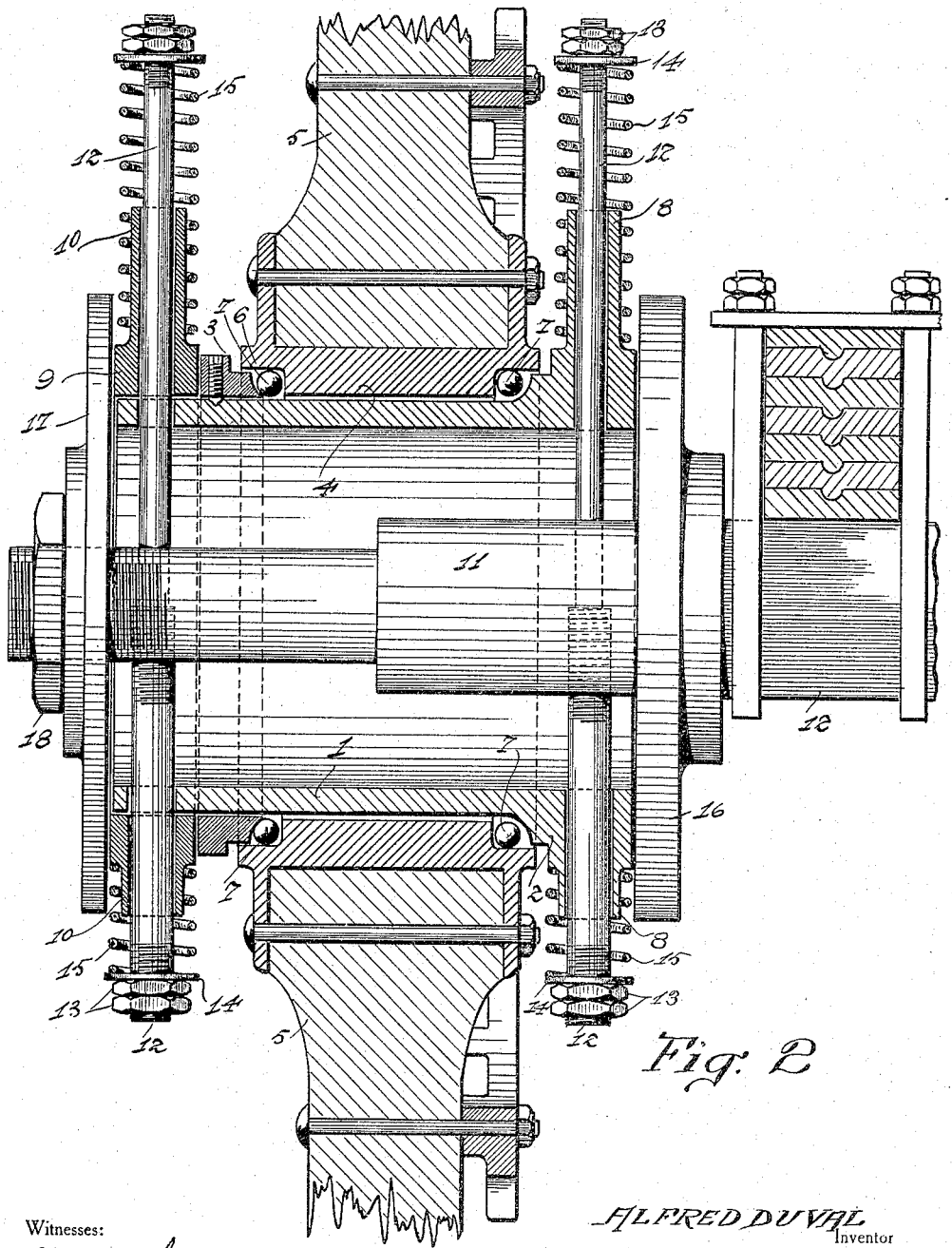

In the drawings: Figure 1 is a side view of the hub, as applied, partly broken away to show its interior construction; and Fig. 2 is a section taken on line 2—2 of Fig. 1 looking in the direction of the arrows.

The main objects of the invention are, to provide a neat, compact, durable, and efficient hub for vehicle wheels which will absorb all shocks imparted thereto to such an extent as to render pneumatic tires or other equivalents unnecessary.

Further objects are, to produce a hub of the character described which is of simple and easy construction and can be quickly produced at small cost.

Referring to the drawings in detail, 1 designates the axle skein which is provided, at its inner end, with an integral, outer, annular flange 2 the inner face of which is provided with a rounded channel. A band 3, provided on its inner face with a channel corresponding to the channel of flange 2, is removably secured around sleeve 1, near the outer end thereof, facing the flange. A hub 4, in which are secured the inner ends of spokes 5, is mounted about the central portion of sleeve 1, between flange 2 and band 3. This hub is provided, in each side of its inner face, with an annular groove 6 of rectangular cross section, which, when the collar is in operative position, coöperates with the channels of the flange and band to form raceways which contain the ball bearings 7. By this means the wheel is mounted on ball bearings to rotate freely about skein 1 with a minimum of friction.

At the inner end of skein 1, two diametrically opposite short sleeves or nipples 8, integral with flange 2, are provided. A sleeve band 9, provided with integral nipples 10 corresponding to nipples 8, is removably secured around the outer end of sleeve 1. The bands 3 and 9 and nipples 10 correspond in size and shape and relative positions to the flange 2 and nipples 8. The spindle 11 of the fixedly mounted axle 12 is of approximately the same length as skein 1 and is normally centrally located therein. Near each end of spindle 11 a vertical rod 12 is secured therethrough, the ends of which project through and beyond the nipples 8 and 10 so that skein 1 is vertically slidable thereon. The lower portion of the rod is enlarged and screw threaded at its inner end and is threaded into a similarly threaded enlarged bore in the lower half of spindle 11. By this means, the rods are secured through and to the axle spindle, in a vertical position. This, of course, secures skein 1 against rotation. The ends of rods 12 are threaded to receive nuts 13 which hold washers 14 in position thereon. A compression spring 15 is mounted about each of the nipples and the projecting end of rod 12, with its outer end bearing against the washer 14 and its inner end bearing on the flange 2 or band 9, the whole forming a spring suspension for the skein. If the wheel encounters an obstacle it will be forced upwardly, against the action of the springs which will absorb the shock, while the axle 12 will remain stationary, or practically so, so that no shock is imparted to the vehicle. The lower springs 15 prevent any shock due to the sudden expansion of the upper springs, or raising of the vehicle body from any cause, the two sets of springs thus coacting to produce a very efficient shock absorber.

The skein 1 is of sufficiently great interior diameter to have a proper amount of vertical movement without being unnecessarily large, and the springs and their coöperating elements are mounted on the outside thereof, thus securing a very compact construction, with the additional advantage that the springs are readily accessible.

At the inner end of spindle 11, there is a circular hub plate 16 integral with axle 12.

This plate is of somewhat greater diameter than skein 1 and fits snugly against the inner end thereof so as to effectually close it, thus preventing entry of grit, &c. A similar plate 17 is removably secured on the outer end of spindle 11, by a nut 18 which is threaded on to the screw threaded outer portion thereof. The plates 16 and 17 are of sufficiently greater diameter than the interior of skein 1 to keep it effectually closed at all times, even when the wheel is moved to its extreme limit up or down. If desired, these plates can be of ovoidal shape, as will be obvious.

To take the hub apart, or demount the wheel, it is only necessary to remove the outer plate, the bands 9 and 3 and rods 12, as will be clear from Fig. 2 of the drawings.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In a device of the character described, a vertically movable skein, a fixed axle spindle mounted therein and of less diameter than the interior thereof, plates carried thereby and adapted to constantly close the ends of the skein, rods secured in the said spindle and projecting through the sides of the said skein, springs mounted about the outer portions of the said rods and adapted to suspend the skein, means for securing the said springs in position, and a hub rotatably mounted about the center of the said skein.

2. In combination; an axle spindle; a skein concentric therewith and spaced therefrom and provided with two integral diametrically opposite nipples, and having an integral outer annular flange provided with a rounded channel, at its inner end, the said skein being further provided, near its outer end, with two diametrically opposite bores in horizontal alinement with the said nipples; a sleeve band provided with integral nipples adapted to be matched with the bores of the skein, secured about the outer end of the said skein; a band provided with a channeled inner face secured on the said skein, inside of the said sleeve band; a hub mounted about the central portion of the said skein and provided, on its sides, with annular grooves adapted to coöperate with the channels of the said band and the flange of the skein to form raceways; ball bearings mounted in the raceways thus formed; vertical rods secured through the said axle spindle and extending through the nipples of the said skein and sleeve band; coil springs mounted about the extended ends of the said rods; means for securing the said springs in position; a plate integral with the said spindle and adapted to close the inner end of the said skein; a second plate mounted on the outer end of the said spindle and adapted to close the outer end of the said skin; and means for securing the said second plate in operative position.

In witness whereof I have hereunto set my hand in the presence of two witnesses.

ALFRED DUVAL.

Witnesses:
  IRENE F. CLEARY,
  OSCAR C. FERRY.